United States Patent

[11] 3,602,620

| [72] | Inventor | Edwin Eduard Fässler<br>Webichstrasse 25, Zurich, Switzerland |
|---|---|---|
| [21] | Appl. No. | 16,625 |
| [22] | Filed | Jan. 20, 1970 |
| [45] | Patented | Aug. 31, 1971 |
| [32] | Priority | Feb. 21, 1969, Mar. 21, 1969 |
| [33] | | Switzerland |
| [31] | | 2713/69 and 4283/69 |

[54] THERMAL LANCES
29 Claims, 10 Drawing Figs.

[52] U.S. Cl. .................................................. 431/99,
110/1 R, 175/11, 266/1, 29/447
[51] Int. Cl. ........................................................ F21k 5/00
[50] Field of Search ............................................ 266/1 R, 23
R; 110/1 R, 1 J, 1 P; 431/99; 175/11, 13

[56] References Cited
UNITED STATES PATENTS

| 3,260,076 | 7/1966 | Humberg..................... | 431/99 |
| 3,507,231 | 4/1970 | Meier.......................... | 110/1 |

*Primary Examiner*—Gerald A. Dost
*Attorney*—Leon M. Strauss

ABSTRACT: The present invention has reference to a thermal lance or tool with a gas discharge end for working, in particular, boring, cutting and like treating hard base materials, said tool being comprised of a longitudinal core including a cable-shaped bunch of twisted wire elements and a tubular sheath of fusable material encasing said core in tight contact therewith.

Between said elements and said sheath there exist inner spaces or interstices forming passageways for guiding therealong fuel, such as oxygen and like gas, toward said gas discharge end.

THERMAL LANCES

In the thermal boring process of hard materials such as concrete, rock or cast-iron and the like, for example, a stream of oxygen under pressure is driven through a tool consisting of a tube enclosing a core having a wire or rod material, generally known as a thermal lance, the farther or discharge end of the tool having first been raised to white heat, so that a process of combustion is brought about, the tube and the core burning away from the front end as a hole is cut. The cross section of the tube is more or less filled with wire or rod material of the core. In selecting the materials and their dimensions, one has to take into account that the core should burn away along with the tube at the same rate.

There are still other reasons which call for a series consideration of the ratio between the actual core cross-sectional are and the remaining free space cross-sectional area of the tube, because the oxygen passing through the free spaces along a tortuous path of the thermal lance is rather expensive. Therefore, it is desired to keep the free space cross-sectional area of the tube as small as possible. To this end the core must be packed as closely as possible in the tube. Furthermore, the core must be anchored fixedly within the tube since the core has to burn along with the tube and because in operation of the thermal lance only the rear end of the tool is held while the core should not be allowed to move in the tube when the burning of the lance proceeds.

The purpose of the present invention is to provide thermal lances of the kind mentioned above, in which passages needed for the oxygen flow between the individual wires or the rod material of the core and between the core and the inner wall of the tube or sheath, are as narrow as possible in cross section and, additionally, the core made of wires or of rod material is anchored as firmly as possible within the tube.

Known methods practiced in the past for manufacturing such thermal lances failed to give the desired results. When making a thermal tool or lance having a core constituted by wires, for example, the wires have been inserted heretofore into the tube or sheath in groups or singly. With a tube 9 or 10 feet long, for example, the insertion of the very last wire that can be accommodated is naturally difficult. In fact, by this method it is not possible to arrange the wires closely enough in the tube so as to prevent the wires from subsequent moving in relation to the tube and to ensure that the flow of oxygen through the remaining free interstices or spaces does not become excessive. Various attempts have been made for encasing the wires as firmly as possible in the tube. It has been suggested, for instance, to clamp the wires in the tube by the provision of side pressure applied to the outer wall of the tube, grooves being implemented which run around the tube periphery, annularly or helically, so as to project inward and locally constrict the interior passages, thereby wedging the wires in position. When the tube is several yards long and the annular grooves provided for constricting purposes are widely spaced, the effect achieved with them is rendered nugatory as soon as the tube material has burnt away beyond the grooved sections or portions. It has also been proposed that the wires be bent once or several times before their insertion into the tube, so that they might themselves hold one another in place. With this method, however, one cannot obtain a passage of uniform cross section for the oxygen or gas stream, in addition to which the cross section of the passage remains still rather large. In all these known methods additional working steps are required which contribute to the increase of labor and costs.

In thermal lances having a core made of rod material of square or triangular cross section, as commonly used hitherto, the free passages for the oxygen flow is in no way evenly distributed over the tube cross section. While it is easier to produce a firm anchorage between the inner surface of the sheath or tube and a core consisting of rod material, since the rod contacts along its edges with the interior wall of the tube when the rod is inserted, it is nevertheless important that a fairly even distribution of the free passages for the oxygen flow throughout the tube cross section is achieved in the interest of optimum economy during boring and like work operation.

It is therefore one of the important objects of the present invention to obviate the mentioned drawbacks of the thermal lances or tools of the prior art.

According to the invention, thermal lances for boring hard materials, which have a fusible sheath enclosing the core that burns away together with the sheath, are exposed to and fed by a stream of oxygen passing through the sheath. The invention further relates to methods of manufacturing such thermal lances.

One aspect of the invention contemplates a thermal lance of the described nature, characterized, principally, by a core of convoluted or twisted wires firmly encased in a sheath. Preferably the wires assume the form of a cable which is firmly encased in and by the sheath.

According to another aspect of the invention, a thermal lance of the described kind is characterized, principally, by the fact that the core, which comprises at least one part and lies in the same axial direction as the sheath, has at least one profiled outer or inner face running in lengthwise direction, so that passages therein conduct the flow or stream of oxygen, the passageways being bounded by the profiling of the core and by the fact that the core remains in firm or tight contact with the inner surface of the sheath, only sections thereof running parallel to the common longitudinal axis.

According to still another aspect of the invention, a method of making a thermal lance is characterized by the fact that wires re twisted preferably all in the same direction, to form a cable formation which is capable of being firmly encased in a sheath.

According to still a further aspect of the invention, a method of applying a thermal lance is characterized in that a core is produced first and then a tubular sheathing is formed around it. The sheath may be formed, for instance, from strip material which is wound helically onto the core, the edges of the turns of said strip material being joined tightly together by welding, for example. Alternatively, the sheathing may be drawn around the core or formed around the core by extrusion of a suitable sheath material.

If in a thermal lance according to the invention the core consists of cable-shaped wire elements, a length of the cable may be longitudinally forced into a tube having the same length. Alternatively, the cable of wire elements may be inserted into a heated tube, which then, as it cools, shrinks so as to encase the cable firmly. It is also possible to insert the cable of wires into a tubular sheath, which is then subjected to mechanical deformation by pressing or drawing so as to encase the cable forming wire elements firmly.

If the thermal lance according to the invention has a core with a profiled outer or inner face, so that passages to conduct the oxygen flow are formed and bounded by profiling, then the core may, for instance, have a cross section which resembles a gearwheel and remains in contact with the sheath which, if desired, may also be profiled to a similar gearwheel shape on its inside, passages for the oxygen flow being then formed by gaps between the teeth of the core or the sheath, respectively. In a modified embodiment, the core may be in the form of a rod profiled to assume a cross section made up of tongues radiating from the center portion of the rod cross section, so that the "tooth" depth is markedly greater than the "tooth" width. Additionally, the core may be hollow so that the interior of the core can also serve as a passageway for the oxygen gas. It is also possible to constitute the core of two or more parts arranged coaxially, for example so that an inner core member is inserted into a hollow outer core member, a profiled face of at least one of said core members being in contact with the other member, whereby passages for the oxygen are provided between the members.

Further details and advantages of the invention will become evident from the following description of various practical forms of the thermal lance, given solely by way of example, in conjunction with the accompanying drawings, in which.

Figure 9:
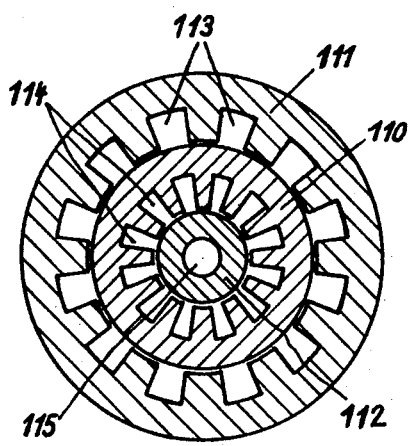
Figure 10:
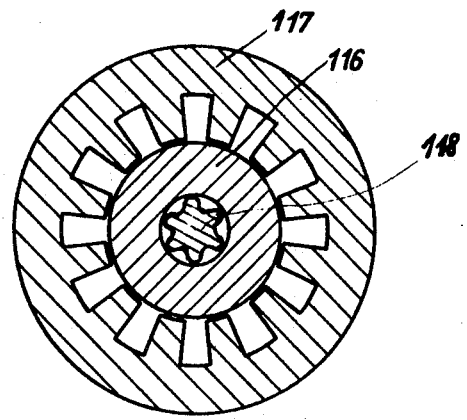

FIG. 9 is a cross section of yet another form of thermal lance, in which the core is composed of two parts, the outer part of which is tubular and profiled inside, while the inner part is a hollow rod inserted into the said outer tubular part, this two-part core being inserted into a similarly profiled tube body of larger diameter, which constitutes the sheath; and FIG. 10 is a cross section of still another form of thermal lance, in which the sheathing tube is plain outside and profiled inside and contains by way of core an outer tubular member that is plain outside and inside and an inner member in the form of a profiled rod.

Figure 1:
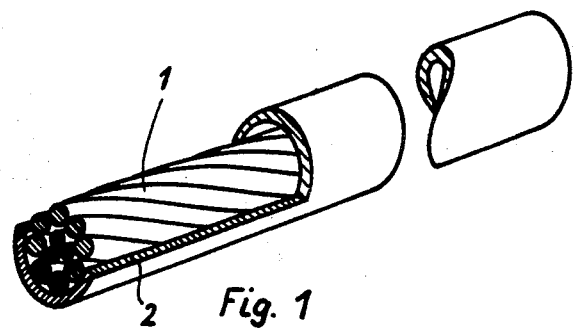
FIG. 1 is a perspective drawing of a portion of a thermal lance or tool embodying the invention, comprising a cable-shaped wire assembly with a tubular sheath, one end of the latter being broken off to show details of the core.
Figure 2:
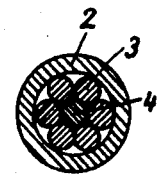
FIG. 2 is a cross section of the lance, in which the cable core, consists of a single wire.
Figure 4:
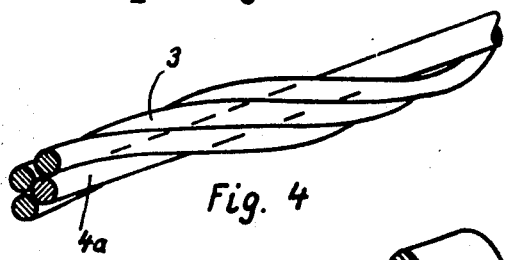
FIG. 4 is a perspective view of a portion of the cable in the lance shown in FIG. 2, the forward end of the cable being sectioned and the end of the core wire being tapered.

In FIG. 1, the thermal lance or tool consists of a wire cable 1 and a cylindrical sheathing tube 2, into which the cable has been force-fitted, or which has been shrunken onto the cable or anchored to it mechanically, as by pressing or drawing. The cable 1 consists of wires 3, all twisted in the same direction and may contain six wires, for example, arranged around a core 4 in the form of a single wire extending along the longitudinal axis of the sheath, as shown in FIG. 2. In a variant of this lance shown in FIG. 3, the core 4 consists of three wires, the diameter of each of which is kept smaller than that of the eight wires surrounding the center core 4.

If the cable is to be force-fitted into the sheath, it is desirable for one end of the core to be tapered as indicated at 4a, so that this end part of the cable is slightly smaller in diameter than the inside of the sheath, to make it easier to be inserted into the latter.

Figure 5:
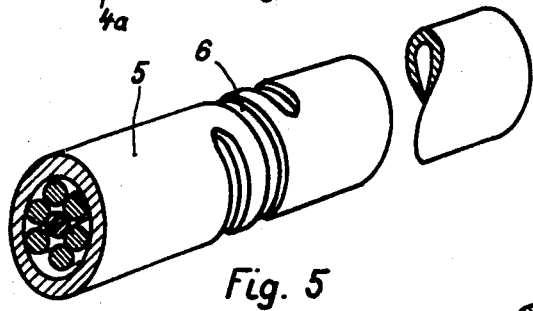
FIG. 5 shows another form of a lance, in which the tubular sheath is helically grooved from without said sheath, so as to constrict the sheath cross section thereat.

In FIG. 5 the cable-shape of FIG. 2 has been introduced into a tube 5 the inner diameter of which is kept slightly larger than the diameter of the cable arrangement, the tube 5 having been provided from the outside thereof with one or more helical grooves or ridges 6 pressed into the tube interior so as to constrict the same and provide a firm grip on the core-cable arrangement. Several such grooves or ridges may be provided, spaced apart at any desired intervals along the enveloping tube.

The sheath may also be a tube produced by welding together the longitudinal edges of a sheet of metal which, when laid flat, is rectangular in shape. The cable may then be inserted into the tube thus produced, but it may also be enclosed in a tube while this is being formed by welding. In the case of drawn tube, similarly, the core-cable arrangement may be enclosed within the tube while this is being drawn.

Figure 6:
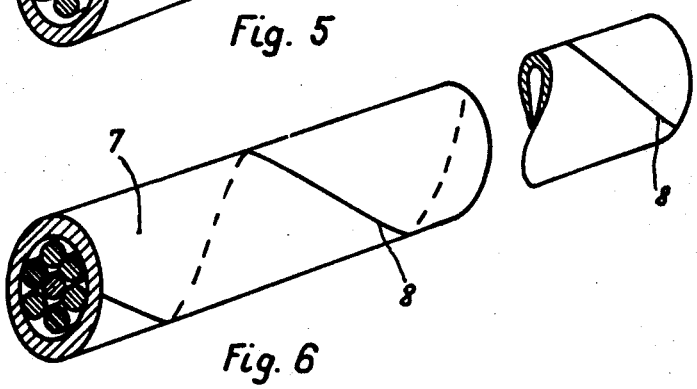
FIG. 6 shows another form or embodiment of the lance, in which the cable has been wound helically with sheathing material in strip form, the forward end being shown in section.

Another method of sheathing, shown in FIG. 6, consists in winding strip metal 7 helically around the cable, the helical edges 8 then requiring only to be welded gastight, to enable the stream of oxygen to pass through to the front end of the tube as this latter burns away.

Figure 7:
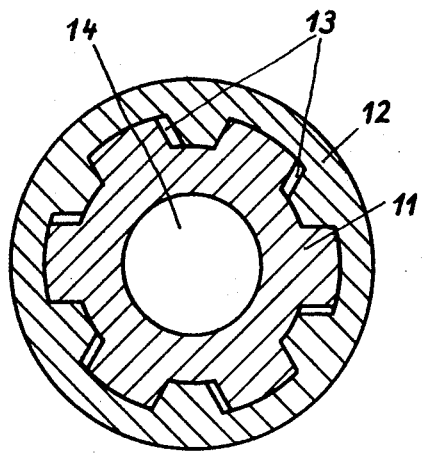
FIG. 7 is a cross section of a thermal lance according to the invention in which the core is a hollow rod profiled to present a toothed section, which is inserted into a tube having internally profiled and projecting strips, which likewise present a plurality of teeth seen in section.

The thermal lance shown in FIG. 7 consists of a core 11 in the form of a hollow profiled rod shaped in cross section like a gearwheel, this core being firmly encased in a sheathing tube 12 similarly profiled with raised or projecting ridges which fit into the gaps between the teeth on the core 11 but are narrower than these, so that passageways 13 are formed between the ridges and the core teeth to enable a stream of oxygen to guide the same and pass through toward the forward effective end of the tool or lance. The hollow space 14 at the center of the core 11 also serves as an oxygen passage.

Figure 8:
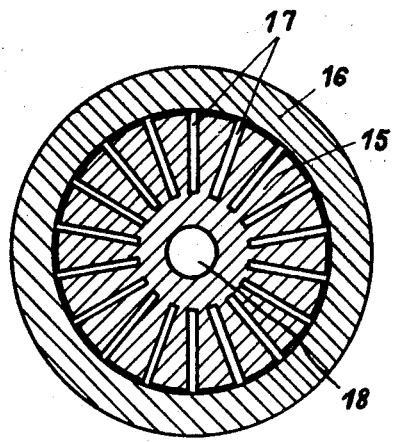
FIG. 8 is a cross section of still another form of thermal lance, in which the core is formed by a hollow rod profiled to present a radiating-tongue section, this rod being inserted and forced into a tube or sheath having a round inside wall.

In FIG. 8, the core 15 is profiled to present a section which is shaped like radiating tongues and is inserted into a plain-walled sheathing tube 16 so that triangular-sectioned passages 17 which, like the hollow space 18 at the center of the core, serve to direct the flow of oxygen and are formed between the individual tongues radiating from the center of the core to the sheath.

In FIG. 9, the core is made up in two parts, the outer part or member 110 of which and the sheath 111 are tubes of different diameters carrying similar profiled teeth on the inside, one inserted within the other, while the inner core member 112 comprises another tube body inserted into the outer hollow member 110 of the core. The profiles of the sheathing tube and of the outer core member 110 form passageways 113 and 114, respectively, for the oxygen gas, which may also be passed through the hollow space 115 of the central tube or member 112.

Another form of thermal lance, illustrated in FIG. 10, has a two-part core consisting of a tube 116 which is plain and smooth inside and outside and is inserted into an internally profiled sheathing tube 117 and an inner core member 118 in the form of a profiled rod located in the tube 116.

The shapes of profiles used are obviously capable of numerous variations, because the only principle to be observed here is that passages distributed over the entire cross-sectional area shall be formed between a core and a sheathing tube, the one being fitted as firmly as possible into the other to prevent relative movement, or movement between the individual members of a core composed of several parts, the said passageways serving to guide a stream of oxygen in which the thermal lance can burn away from the front end, the oxygen consumption being controlled as far as possible.

It is obviously possible, by the choice of appropriate shapes for the profile cross section, to determine at will the size of the interstices or spaces left between the members of the thermal lance and hence to adjust the flow of oxygen to suit the purpose at hand.

In a thermal lance or tool provided with a core of a bunch of wires the flow of oxygen through the tubular sheath is governed by the cross-sectional area of the free passage between the wires. To keep the oxygen consumption down, therefore, the method used hitherto, with conventional thermal lances in which parallel wires are inserted into the tube is to provide grooves running around the tube, which by constricting the cross section enable the rate of flow to be controlled. The same effect is achieved with the outer helical grooves shown in FIG. 5 when the cable is not tightly encased in the tube. When, however, the tube encases the cable core tightly, as, for example, when the cable is force-fitted into the tube or the tube is shrunken onto the cable formation or some other similar form of anchorage is provided, the twist in or convolutions of the wires enables the tube cross section to be far more closely filled than when the wires are inserted one by one for assembly purposes. With a cable, the individual wires are so closely packed that in the case of a tube having a inner diameter of 12 mm. and a core made up of three wires of 3 mm. gauge surrounded by eight wires of 3.5 mm. gauge, the cross-sectional area of passage between the wires is no more than 13.5 percent of the entire interior cross section of the tube. If the inside diameter of the tube is smaller and the gauge of wire is approximately the same, as in the form of construction described in connection with FIG. 2, the same thickness of wire being used for the core and surrounding wires, the cross section of passage naturally constitutes a larger percentage of the entire cross section. In any case, however, the said value and the values obtainable with other dimensions are smaller than the values that can be achieved with thermal lances made as heretofore. Consequently, a thermal lance of the type described also burns away more slowly.

In general, good results have been obtained when the cross section of passage between the wires constitutes 10 percent to 25 percent of the entire interior cross section of the tube. A particularly desirable feature is that the twisting of the wires prevents the oxygen turbulence or eddying effect that arises with thermal lances of conventional type; instead, rotary motion is imparted to the oxygen as it moves towards the end of the tube. This not only prevents turbulent movement of the oxygen as it leaves the tube, but also results in the tube being burnt away more evenly and tends to oppose the occurrence of flashback.

One example of a material that has found suitable for both core and sheath is a metal alloy containing the following constituents:

| | |
|---|---|
| Mn 0.35% by weight | C 0.04% by weight |
| Mo 0.01% by weight | S 0.01%–0.033% by weight |
| Si 0.02%–0.04% by weight | Ni 0.02% by weight |
| P 0.025% by weight | Al 0.08% by weight |
| | Fe balance to make 100%. |

The metal alloy given as an example can naturally be modified, moreover, to alter the burn characteristics, according to the purpose for which the thermal lance is used. The silicon content, for instance, may be increased to as much as 4 percent by weight.

Figure 3:
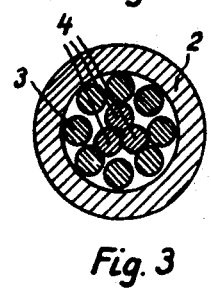
FIG. 3 is a cross section of another embodiment in which the cable core contains three wires.

The manufacturing of the described thermal lance is practicable in several ways. One method of manufacturing consists in the formation of a cable of wires, all twisted in one and the same direction, and in the firm encasing thereof in a sheath (FIGS. 1–6). The encasing process may be done by force-fitting the bunch or cable of wires into a tube, which forms the sheath, or by inserting the cable of wires into a heated tube which, then, as it cools, shrinks so as to encase the cable firmly (FIGS. 1–3). Furthermore, the cable of wires may be inserted into a tubular sheath, which then may be subjected to mechanical deformation by pressing or drawing so as to encase the cable firmly or by providing the tube from outside with one or more helical ridges serving to constrict the interior of the tube (FIG. 5).

Another method of manufacturing a thermal lance according to the invention consists in that the core, which may be a cable of wires or a profiled rod, is produced first and then the sheathing tube is formed around it.

To this end, a group or bunch of bundled wires is first prepared or the individual wires may be twisted together to assume cable formation and then the sheathing tube may be formed around this core by, for instance, fitting a sheet of metal around it and then welding the butted side edges together so as to produce a tube. For this purpose, both the wires and the sheeting in the form of a flat strip may be taken from storage coils. The wires can be bundled parallel or they may be twisted together after leaving the storage coils. They are then taken to a tube rolling mill, through which the metal sheeting is also fed continuously, so that the sheeting is shaped around the wires by rolls to form a tube, after which the side edges of the sheeting are continuously welded together. If desired, the tube encasing the wires may also be subjected to deformation by the application of pressure in such a way as to reduce its diameter and hence also the cross-sectional area of the interstices between the wires, so that the flow of oxygen through the tube can be more precisely preset and thus regulated, while at the same time the wires are extremely effectively anchored in the tube. The thermal lance thus produced continuously then requires only cutting to the desired lengths.

In a variant of this method, it is also possible to produce the sheathing tube around the core by drawing. Another possibility is to produce the sheathing tube from a workable material by extrusion, the tube being extruded around the core. Finally, it is possible for the sheathing material in strip form to be wound helically onto a core made in any desired manner, the edges of the turns of strip material then being welded together (FIG. 6).

All these methods of producing the sheathing tube are equally applicable when a suitably regular profiled rod, solid or hollow, is produced to shape the core, instead of a parallel assembly or a cable of wires. In that case, the profiled rod must make contact, along its edges at least, with the inner wall of the tube and the profiling must form passages for the flow of oxygen. Such a rod may be provided, for example, with a toothed cross section or may be deeply recessed to form a cross section shaped like radiating tongues, but any other shapes are acceptable whereby interstices distributed as evenly as possible over the cross section can be formed.

By the methods described above, thermal lances or tools can be produced very simply and cheaply and in far shorter time than is possible by the methods of manufacture known hitherto.

The embodiments of the invention in which an exclusive property or privilege is claimed are defined as follows:

1. Thermal lance or gas operated burner tool with a gas discharge end, for working, in particular, boring, cutting and like treating hard base materials in the form of concrete, rock, cast-iron and the like characterized by a longitudinal core comprising a cable-shaped bunch of twisted wire elements, and a tubular sheath of fusible material encasing said core in tight contact therewith, inner spaces prevalent between said elements and said sheath forming passageways for guiding therealong fuel in the form of oxygen gas and the like when fed through said sheath toward its discharge end.

2. A lance according to claim 1, wherein said core includes at least one single wire element extending along the longitudinal axis of said sheath, and at least one enclosure of circular-shaped formation composed of wires in convoluted form grouped around said single wire element.

3. A lance according to claim 2, wherein said core includes a conically shaped end portion of decreasing dimension facilitating tight fit of said core in said tubular sheath.

4. A thermal lance according to claim 1, in which the diameter of a number of wires forming the core differs from that of the wires twisted about said core.

5. A thermal lance according to claim 1, in which the sheath is of tubular configuration, into which a bunch of cable wires, all of the same length, is force-fitted.

6. A thermal lance according to claim 1, in which said sheath is shrunken onto the cable wires forming said core.

7. A thermal lance according to claim 1, in which said sheath is drawn onto the cable wires and press-fitted thereon.

8. A thermal lance according to claim 1, in which the sheath constitutes a sheet of metal by which the cable of wire elements is encased and which has its longitudinal edges welded together to transform it into a covering tube.

9. A thermal lance according to claim 1, in which the sheath is a tube into the surface of which one or more helical ridges are forced, which constrict the inner cross section of the tube to ensure that the cable of wire elements is firmly encased thereby.

10. A thermal lance according to claim 1, in which the sheath consists of a predetermined length of strip material wound helically about the core of a cable of wire elements, the edges of the turns of the strip material being joined together by welding to provide a gastight envelope.

11. A thermal lance for boring hard materials, which has a fusible sheath containing a core that burns away together with the sheath by means of a stream of oxygen passing through the latter; characterized by the fact that the core, which consists of at least one tubular member and extends in substantially the same axial direction as the sheath, has at least one profiled surface extending lengthwise of the axis of the sheath, so that passages to conduct the flow of oxygen are formed and bounded by the profiled surface, said core firmly contacting the inner surface of the sheath in intermittent relation and parallel to the common axis of said sheath and said core.

12. A thermal lance according to claim 11, in which the inner surface of the sheath is plain and smooth.

13. A thermal lance according to claim 11, in which the inner surface of the sheath is profiled.

14. A thermal lance according to claim 11, in which the outer surface of the core is profiled and the inner surface of the sheath is conformed to the profiled surface of said core and shaped for contact with the latter.

15. A thermal lance according to claim 11, in which the core is tubular in shape and forms a passage for the flow of oxygen therein.

16. A thermal lance according to claim 15, in which the inner face of the tubular core is profiled, while its outer surface is in contact with said sheath presenting a profiled inner surface.

17. A thermal lance according to claim 11, in which concentric tubular members form the core which has an inner face profiled and in contact with another core member so as to form gas passages.

18. A thermal lance according to claim 11, in which the sheath forms a tube defined by a plain inner surface.

19. A thermal lance according to claim 11, in which the sheath forms a profiled tube provided with tooth-shaped projecting ribs distributed along its inner surface.

20. A thermal lance according to claim 11, in which the core is constituted by a tubular profiled rod tooth-shaped in cross section and inserted into a profiled tubular sheath having an inner surface provided with tooth-shaped projections conformed to the profiled rod.

21. A thermal lance according to claim 11, in which the core is constituted by a solid profiled rod with a cross section made up of radiating tongues, so that the "tooth" depth is markedly greater than the "tooth" width.

22. A thermal lance according to claim 11, in which said core is provided with an outer core of tube configuration plain at the outside surface and profiled at the inside surface, which is inserted into a correspondingly profiled tubular sheath of larger diameter, and a rod forming an inner core, which is inserted into said outer core of tube configuration.

23. A thermal lance according to claim 11, in which the sheath is a tube profiled therewithin and containing a core coextensive in length, said core being force-fitted into said sheath.

24. A thermal lance according to claim 11, in which the sheath is constituted by a sheet of metal fitted around said core to form a tube having abutting side edges welded together along the side edges.

25. A thermal lance according to claim 11, in which the sheath constitutes a strip of metal wound helically onto said core, its turns being joined together by welding.

26. A thermal lance according to claim 11, in which at least one of the core faces extending along the core is profiled symmetrically about the longitudinal center line of the core.

27. A thermal lance according to claim 11, in which said core consists of one or more parts extending in the same axial direction as said sheath and is coaxial therewith.

28. A thermal lance according to claim 11, in which said core comprises several parts and extending in the same axial direction as said sheath, so that said core and said sheath are directed parallel to one another.

29. A thermal lance according to claim 11, wherein said core is firmly anchored in its sheath, the latter being constricted in intervals along the entire length by pressing.